United States Patent
Huizenga

(10) Patent No.: US 8,104,039 B2
(45) Date of Patent: Jan. 24, 2012

(54) METHOD FOR BALANCING RESOURCE SHARING AND APPLICATION LATENCY WITHIN A DATA PROCESSING SYSTEM

(75) Inventor: Gerrit Huizenga, Portland, OR (US)

(73) Assignee: International Business Machines Corporation, Armonk, NY (US)

(*) Notice: Subject to any disclaimer, the term of this patent is extended or adjusted under 35 U.S.C. 154(b) by 1570 days.

(21) Appl. No.: 11/462,843

(22) Filed: Aug. 7, 2006

(65) Prior Publication Data
US 2008/0034370 A1   Feb. 7, 2008

(51) Int. Cl.
*G06F 9/46* (2006.01)
*G06F 15/173* (2006.01)

(52) U.S. Cl. .......................... 718/104; 709/223

(58) Field of Classification Search .................. 718/104; 709/223
See application file for complete search history.

(56) References Cited

U.S. PATENT DOCUMENTS

| | | | |
|---|---|---|---|
| 5,812,774 A | 9/1998 | Kempf et al. | |
| 6,105,053 A | 8/2000 | Kimmel et al. | |
| 6,154,787 A | 11/2000 | Urevig et al. | |
| 6,199,124 B1 | 3/2001 | Ramakrishnan et al. | |
| 6,754,739 B1* | 6/2004 | Kessler et al. | 710/52 |
| 2002/0016812 A1* | 2/2002 | Uchishiba et al. | 709/104 |
| 2002/0053011 A1 | 5/2002 | Aiken et al. | |
| 2004/0006665 A1 | 1/2004 | Moss | |
| 2004/0068479 A1 | 4/2004 | Wolfson et al. | |
| 2004/0073730 A1 | 4/2004 | Horii et al. | |
| 2004/0073758 A1 | 4/2004 | Blumrich et al. | |
| 2006/0075204 A1* | 4/2006 | Kumar | 711/173 |

FOREIGN PATENT DOCUMENTS

| | | |
|---|---|---|
| WO | WO 97/29432 | 8/1997 |
| WO | WO 03/009144 | * 1/2003 |

OTHER PUBLICATIONS

H. Franke et al., "Improving Linux Resource Control Using CKRM," OLS 2004, 16 pages.
J. Moilanen et al., "Using Genetic Algorithms to Autonomically Tune the Kernel," OLS 2005, 13 pages.

* cited by examiner

*Primary Examiner* — Jennifer To
*Assistant Examiner* — Blake Kumabe
(74) *Attorney, Agent, or Firm* — Walter W. Duft

(57) ABSTRACT

A technique for managing application workloads in a data processing system includes establishing a reserve resource allocation of a data processing resource for use by a data processing application having a need to utilize the resource, sharing a portion of the resource that is not part of the reserve resource allocation or otherwise utilized by the application with other applications, allowing the application to consume the reserve resource allocation when the application desires to increase its utilization of the resource, and replenishing the reserve resource allocation from the sharable portion of the resource as the application consumes the reserve resource allocation. Advantageously, the reserve resource allocation can be effectively managed so that the data processing resource is available to the application in order to reduce application latency without depriving other applications of the ability to use the resource.

27 Claims, 7 Drawing Sheets

METHOD FOR BALANCING RESOURCE SHARING AND APPLICATION LATENCY WITHIN A DATA PROCESSING SYSTEM

BACKGROUND OF THE INVENTION

1. Field of the Invention

The present invention relates to application workload management in a uniprocessor or shared multiprocessor computing environment. More particularly, the invention is directed to techniques for allocating a shared data processing resource among concurrently executing workloads.

2. Description of the Prior Art

By way of background, workload management in a uniprocessor or shared multiprocessor system involves the intelligent sharing of a data processing resource among plural applications without any one application dominating the usage of the resource and thereby degrading the performance of peer applications. Exemplary resources that can be managed in this fashion include CPU time, memory, disk I/O bandwidth, and network bandwidth. In some workload management systems, a determination is made (typically by a system administrator) as to how much of a given resource will be needed by all of the applications that will be utilizing the resource. The resource is then allocated into distinct dedicated resource pools, each of which represents a portion of the resource. Each dedicated resource pool is assigned for exclusive use by an application, or a by a set of related applications. For convenience, the term "application" shall be hereinafter understood to mean either one or more applications.

The fixed allocation scheme ensures predictability of application response times because each dedicated resource pool is always available to its applications. However, an application's actual resource needs may often be less than the amount provided by the dedicated resource pool. Hence, the resource is not optimally utilized because a portion thereof may be dedicated without being used. To correct this problem, some workload management systems permit the sharing of a resource among competing applications. Instead of being assigned a fixed resource allocation, an application is given a minimum resource guarantee within a non-dedicated resource pool that is otherwise sharable among all applications. The goal of this method of workload management is to promote resource allocation fairness by ensuring, on one hand, that an application's resource utilization level does not fall below the minimum guarantee, while on the other hand allowing the unallocated portion of the resource to be shared with other applications that may have temporary needs in excess of their own minimal guarantees. A maximum resource allocation can also be made to define the maximum utilization of a resource that an application will be granted. In some cases, the maximum resource allocation is fixed. In other cases, it simply represents the difference between the total amount of resource available to an application and the actual resource usage by other applications.

A disadvantage of the resource sharing approach is that an application may be initially given a smaller guarantee of a resource than it actually needs during periods of peak resource usage. The only way that the application can acquire more of the needed resource is by growing into the portion of the assigned resource pool that is shared with other applications. This means that application responsiveness may not be predictable during periods of spikes in resource usage. In particular, if the shared resource pool is 100% utilized and an application has permission and desire to increase its use of the shared pool, the software responsible for resource allocation must reclaim the resource from other applications before an additional allocation can be given to the requesting application. The allocation of additional resource from the shared pool to the requesting application may therefore take time. For example, if the resource is memory, the application would suffer latency while data is flushed to disk and memory is freed or otherwise reclaimed. Such delays in resource allocation may impact the performance and response times of the application making the request.

Accordingly, whereas some workload management solutions waste a resource by creating over-sized dedicated resource pools, other solutions impact application performance by under-allocating from a shared resource pool and introducing latency when more of the resource is acquired. The present invention is directed to improvements in the latter type of application workload management, such that the problems inherent in resource sharing may be avoided. In particular, what is needed is a technique whereby a data processing resource can be shared without penalizing applications that may have an immediate need for an increased share of the resource.

SUMMARY OF THE INVENTION

The foregoing problems are solved and an advance in the art is obtained by a novel method, system and computer program product for managing application workloads in a data processing system using the notion of a dynamically maintainable reserve resource allocation of a data processing resource. The inventive technique includes establishing the reserve resource allocation for use by a data processing application having a need to utilize the resource, sharing a portion of the resource that is not part of the reserve resource allocation or otherwise utilized by the application with other applications, allowing the application to consume the reserve resource allocation when the application desires to increase its utilization of the resource, and replenishing the reserve resource allocation from the sharable portion of the resource as the application consumes the reserve resource allocation. Advantageously, the reserve resource allocation can be effectively managed so that the data processing resource is available to the application in order to reduce application latency without depriving other applications of the ability to use the resource.

Accordingly to exemplary illustrated embodiments, the reserve resource allocation may be of fixed or variable size. If the latter, size of the reserve resource allocation may be varied according to a level of utilization of the resource by the application. If desired, the reserve resource allocation may be managed according to a predetermined time quanta schedule. Alternatively, the reserve resource allocation may be managed according to a state of operation of the application. Management of the reserve resource allocation may be performed according to a provisioned policy or using an autonomic self-tuning technique. In addition to the reserve resource allocation, the application may be assigned a minimum resource allocation and a maximum resource allocation.

BRIEF DESCRIPTION OF THE DRAWINGS

The foregoing and other features and advantages of the invention will be apparent from the following more particular description of exemplary embodiments of the invention, as illustrated in the accompanying Drawings, in which.

DETAILED DESCRIPTION OF EXEMPLARY EMBODIMENTS

Figure 1:
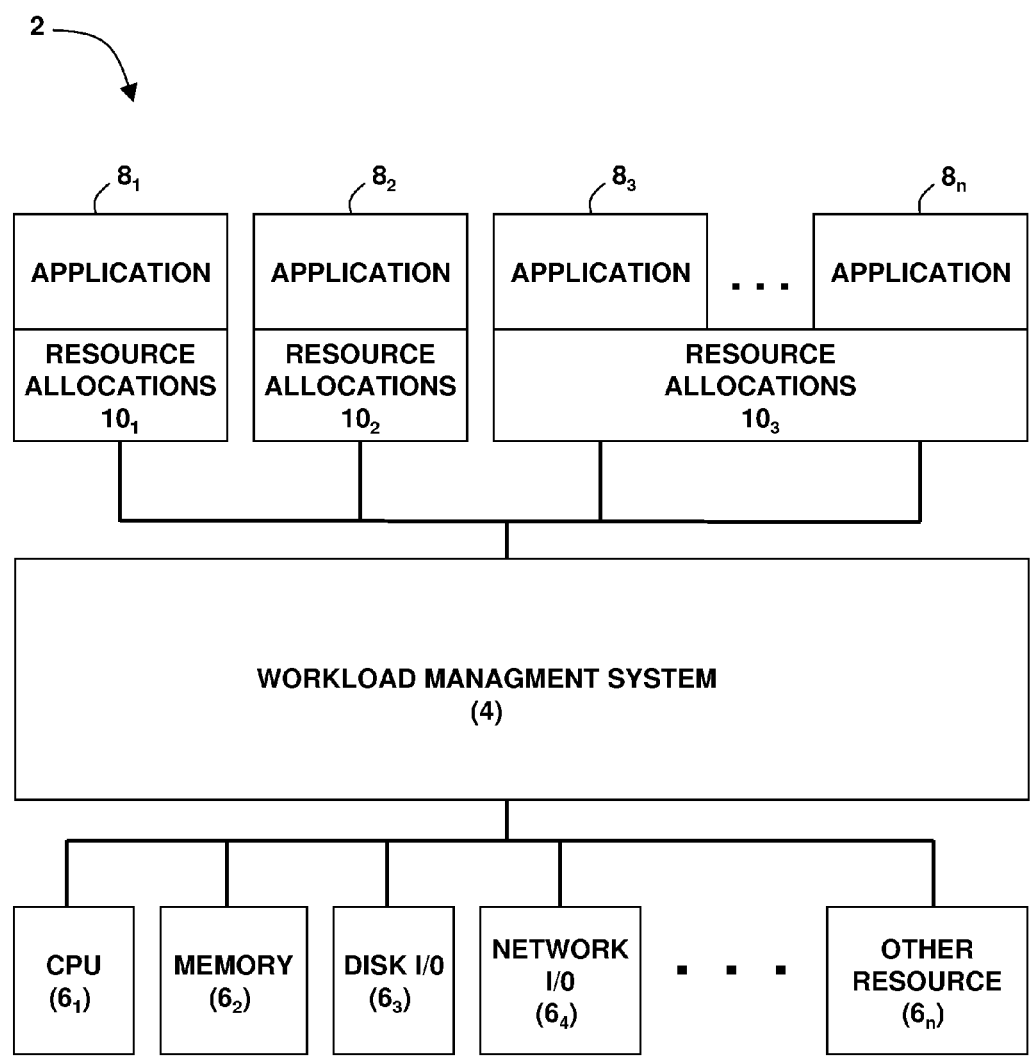
FIG. 1 is a functional block diagram showing a data processing system that is adapted to perform application workload management in accordance with the present invention.

Turning now to the Drawing figures wherein like reference numerals indicate like components in all of the several views, FIG. 1 illustrates an exemplary data processing system 2 hosting a workload management system 4. The data processing system 2 may be a single or multi-processor (e.g., SMP or NUMA) machine, a cluster of machines, or an implementation of any other desired computer architecture. The workload management system 4 manages a set of data processing resources $6_1$-$6_n$ for use by plural applications $8_1$-$8_n$, where the number "n" is arbitrary in both cases. The job of the workload management system 4 is to share the resources $6_1$-$6_n$ among the applications $8_1$-$8_n$ by creating a set of resource allocations 10, each of which represents some portion of the total available resources $6_1$-$6_n$. The resource allocations 10 may be given to individual applications or to a set of applications. To illustrate, the applications $8_1$ and $8_2$ are shown as having respective resource allocations $10_1$ and $10_2$, whereas the applications $8_1$-$8_n$ have a common resource allocation $10_3$ assigned to this set of applications as a group. The applications $8_1$-$8_n$ each represent a conventional form of execution context, such as a process, task, thread, etc. whose operation is managed by the data processing system 2.

The workload management system 4 may be implemented using conventional workload management software that has been modified to provide the enhanced workload management features of the present invention. Examples of such conventional workload management solutions include the IBM® AIX® 5L Workload Manager and the Linux® CKRM (Class-based Kernel Resource Monitor) framework. Both workload management systems support operating system resource allocation based on application groupings, and include user interfaces (e.g., the Resource Control File System (RCFS) interface of Linux® CKRM) that allow manual control by system administrators or automated control via workload management middleware. Operating system kernel mechanisms are provided that allow policy-driven differentiated service access to resources such as CPU time, memory pages, disk I/O and network bandwidth. For example, resource controllers (schedulers) are implemented for each allocated resource type to monitor resource usage and ensure that each application receives its specified resource share. A reporting mechanism is also provided for reporting resource usage and other performance information to system administrators via the user interface. System administrators are allowed to allocate resource shares for each application. An application may comprise a group of one or more tasks (e.g., process, threads, etc.) having a common performance goal and common resource requirements. The user interface can be provided using any suitable technique, including system or library calls, sockets, HAL (Hardware Abstraction Layer) calls, message passing APIs, etc. A resource control file system paradigm may also be used to provide the user interface. A resource control file system comprises a tree-structured name space whose directories represent applications. Users can create new application resource allocations by creating new directories. Each directory contains a virtual file that specifies the resource shares for one or more resources that the application will use. Parameters such as the minimum and maximum resource allocations for each resource may be included in this file. Via the user interface, automatic workload management controllers can be developed that automatically set resource shares for applications based on the importance of their work. Such adaptive controllers can use the resource usage information provided by the workload management system's reporting mechanism as feedback to generate resource assignment policies. The user interface also allows resource allocation policies to be created manually by system administrators.

As an alternative to using kernel-based solutions, the workload management system 4 could be implemented with user-level application software, such as user daemons, shared libraries, etc., that utilize conventional operating system calls to modify and monitor operating system parameters that control application access to the resources being managed. In this implementation, a kernel resource management system such as the IBM® AIX® 5L Workload Manager and the Linux® CKRM framework, need not be present. A standard non-workload management-aware operating system may be used. A further implementation option would be to design the workload management system 4 as a hybrid system that includes both operating system and user-level application functionality.

The resources $6_1$-$6_n$ may represent any resource that can be utilized by the applications $8_1$-$8_n$. By way of example only, FIG. 1 illustrates four well known resources; namely, a CPU resource $6_1$, a memory resource $6_2$, a disk I/O bandwidth resource $6_3$, and a network bandwidth resource $6_4$. Any number of additional resources (e.g., up to $6_n$) could also be managed according to administrative needs and preferences. These resources could include any desired hardware, firmware or software entities that may be shared among the applications $8_1$-$8_n$. The CPU resource $6_1$ may represent CPU time, per-application timeslices, scheduling latency (e.g., for real-time applications), etc. An application having a large CPU resource allocation will be scheduled for more CPU time, or will be allocated more timeslices, or will have less scheduling latency, etc., than an application having a smaller CPU resource allocation, and vice versa. CPU utilization may be controlled in the workload management system 4 by varying the scheduling priority of one application relative to other applications. The memory resource $6_2$ may represent physical memory address space. An application having a large memory resource allocation will be assigned more physical memory than an application having a smaller memory allocation, and vice versa. Physical memory may be controlled in the workload management system 4 by varying the number of physical or logical pages allocated to one application relative to other applications. The disk I/O bandwidth resource $6_3$ may represent disk block transfers over time. An application having a large disk I/O bandwidth resource allocation will be have its disk I/O transfers executed more rapidly than an application having a lower disk I/O bandwidth allocation, and vice versa. Disk I/O bandwidth can be controlled in the workload management system 4 by prioritizing the disk I/O requests of one application relative to other applications, such as by adjusting read-ahead caching, buffering, disk write out caching and/or the number of available paths in a multipath I/O subsystem. The network I/O bandwidth resource $6_3$ may represent network throughput, latency, priorities or other throttling of network connection rates over time. An application having a large network I/O bandwidth resource allocation will have a higher network I/O transfer rate than an application having a lower network I/O bandwidth allocation, and vice versa. Network I/O throughput can be controlled in the workload management system 4 by limiting the rate of allocation of sockets, limiting the rate at which connections are processed by sockets, managing IP priority, adjusting SCTP packet/congestion control, etc., of one application relative to other applications.

As described by way of background above, conventional workload management systems that implement resource sharing assign minimum and maximum resource limits to an application for a given resource. The portion of the resource in excess of the minimum resource allocation (up to the maximum resource allocation) may be shared with other applications. A disadvantage of this approach is that the actual resource utilization of an application will usually lie somewhere between the minimum resource allocation and the maximum resource allocation. Whenever the resource requirements begin to exceed the minimum resource allocation, an application can only increase its resource allocation during periods of increased resource demand by growing into the portion of the assigned resource pool that is shared with other applications. This may result in application latency if resource reclamation is needed, as by flushing data to disk in order to free additional memory, for example.

Figure 2:
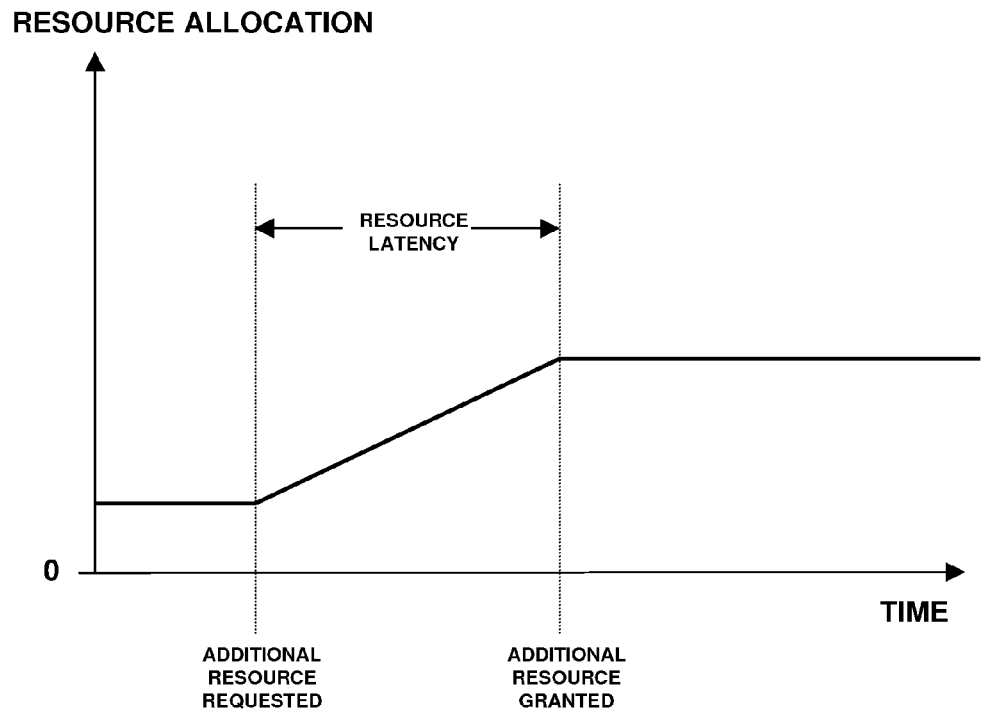
FIG. 2 is a graphical representation illustrating the substantial latency associated with an increase in resource allocation to an application when reclamation of the resource is required.
Figure 3:
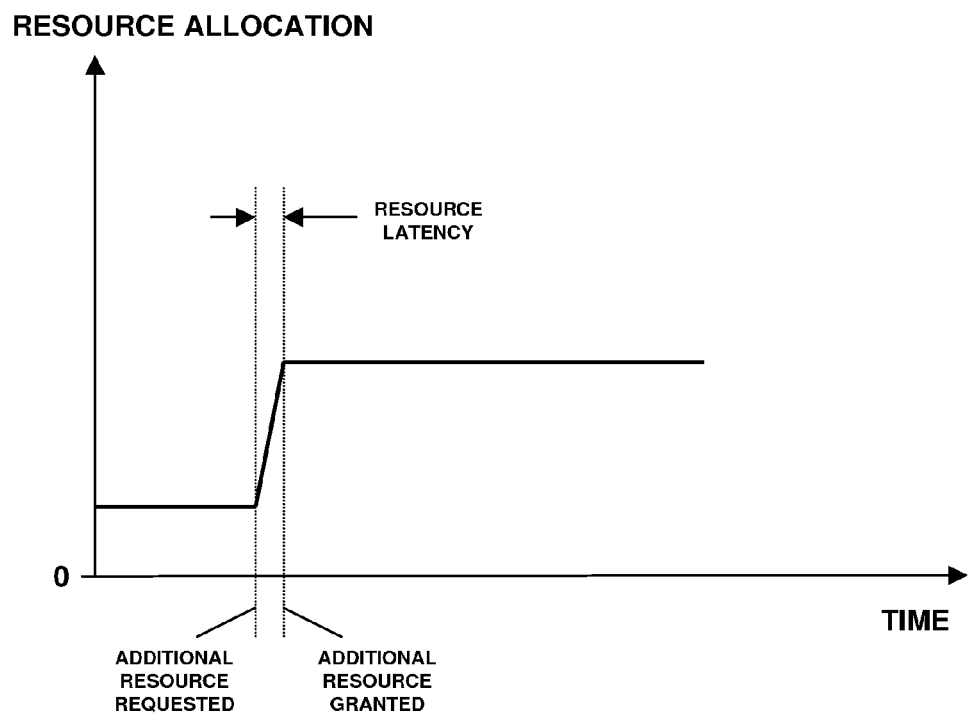
FIG. 3 is a graphical representation illustrating the reduced latency associated with an increase in resource allocation to an application when a reserve resource allocation is provided in accordance with the invention.

FIG. 2 is illustrative. It shows the latency that may occur when an application requests an additional resource allocation that must be reclaimed from other applications because the resource is part of a sharable pool. This problem may be addressed by introducing the concept of a reserve resource allocation. For any given resource, the reserve resource allocation can be made available to an application in order to accommodate spikes in application resource utilization without effective latency. As shown in FIG. 3, because the reserve resource allocation is not shared with other applications, the latency associated with an increase in resource utilization is greatly reduced from the conventional latency shown in FIG. 2. In particular, the reduced latency associated with an application growing into its reserve resource allocation should be comparable to the latency associated with the application's utilization of its minimum resource allocation.

Figure 4:
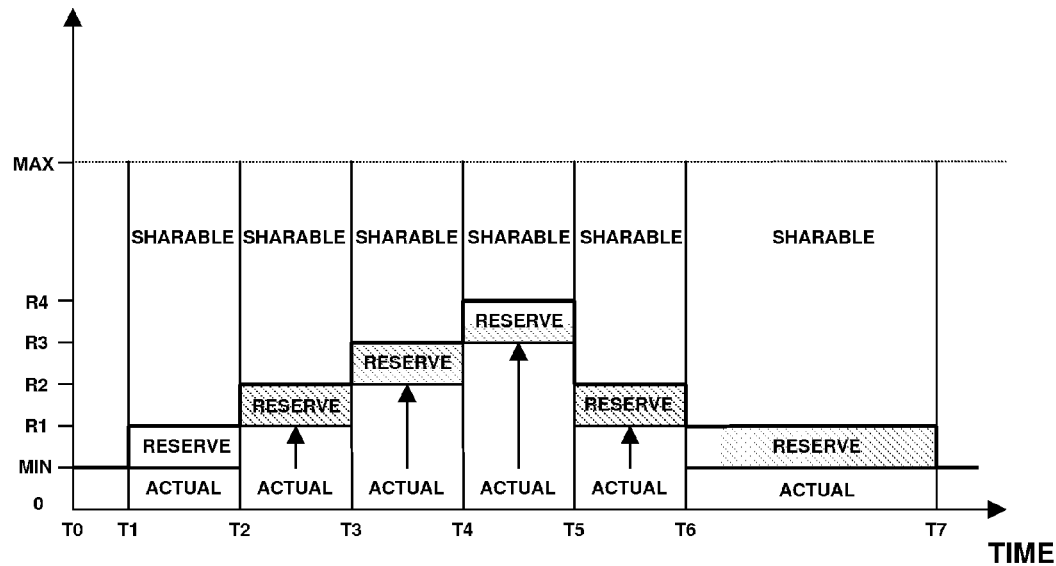
FIG. 4 is a graphical representation showing the maintenance of a reserve resource allocation as actual resource utilization by an application changes over time.

With reference now to FIG. 4, the reserve resource allocation is one of two allocation components that lie between the current resource utilization of an application (which may change over time) and its maximum resource allocation. The other component is the sharable allocation that is available to other applications. The sharable allocation represents the portion of a given resource which is not yet allocated to the application that owns the reserve resource allocation and which is not part of the reserve resource allocation. All of this resource portion, up to the maximum resource allocation, is available for sharing. The reserve resource allocation is explicitly non-sharable. It gives an application the ability to increase its resource utilization without significant latency and thus may be thought of as providing an incremental increase in the guaranteed minimum resource allocation when required. However, unlike the minimum resource allocation, the reserve resource allocation may be dynamically assigned, removed, increased, decreased or otherwise maintained based on the utilization level of the underlying resource (by the application and/or the overall system) and policies that take into account application needs and resource availability.

In FIG. 4, which shows the resource utilization of an exemplary application, the time segment between T0 and T1 represents a period in which there is a guaranteed minimum resource allocation of size MIN, but no assigned reserve resource allocation. The reserve resource allocation is not assigned until T1. At this point, the size of the reserve resource allocation is the difference between resource utilization level R1 and the minimum resource allocation MIN (R1−MIN). At time T2, the actual resource utilization increases to level R1. The additional resources are obtained without significant latency by growing into the reserve resource allocation, in this case consuming all of the reserve. In order to maintain reserve resource capacity, the workload management system 4 may replenish the reserve resource allocation from the sharable portion of the resource pool, reclaiming the required amount of resource from other applications if necessary.

Figure 5:
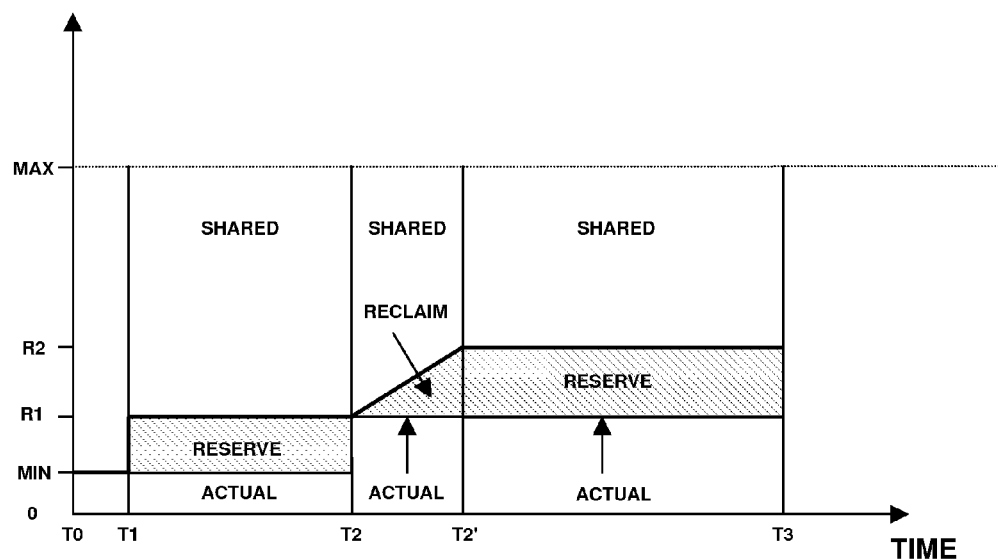
FIG. 5 is a graphical representation showing the maintenance of a reserve resource allocation via resource reclamation following an increase in actual resource utilization by an application that consumes the reserve resource allocation.

As additionally shown in FIG. 5, this resource replenishment process dynamically maintains the reserve resource allocation at a size that is the difference between resource utilization level R2 and the resource level R1 currently utilized by the application. Depending on the prevailing reserve resource management policy (see below), the size of the reserve resource allocation following time T2 may be smaller than, equal to, or larger than the size of the reserve allocation prior to T2. The replenishment process may incur a latency from time T2 to T2' if the resource reclamation is required due to the remaining portion of the resource pool actually being shared rather than merely sharable (as shown in FIG. 5). However, this latency will normally be acceptable because the application has already been granted its requested resource increase and will be less likely to immediately request an additional increase. The benefits of this approach are that the workload management system 4 can initiate resource replenishment but the application that is requesting the resource increase will not be blocked so long as its resource needs do not exceed the current reserve resource level. In this way, the application will always have the ability to increase its resource utilization without significant latency, so long as the reserve resource allocation remains assigned to the application.

As further shown in FIG. 4, a second increase in actual resource utilization occurs at time T3, and a third increase occurs at time T4. In both cases, the application grows into its reserve resource allocation without significant latency. At the same time, as the reserve resource allocation is consumed, the workload management system 4 reclaims resources in order to replenish the reserve to maintain a desired level of reserve resource capacity. At time T3, the reserve resource allocation is increased to a size that is the difference between resource utilization levels R3 and R2. At time T4, the reserve resource allocation is increased to a size that is the difference between resource utilization levels R4 and R3. Times T5 and T6 represent points at which the application decreases its resource utilization. In response, the workload management system 4 may continue to maintain the reserve resource allocations at the desired level. At time T7, the reserve resource allocation is removed from the application by the workload management system 4.

At each time period T1-T7, other applications will have the ability to share the remainder of the maximum resource allocation available to the application (designated as "Sharable" in FIG. 4). Moreover, whenever the reserve resource allocation is not assigned, as at times T0 and T7, all the maximum resource allocation that lies above the minimum resource allocation and which is not being used by the application will be available for sharing. In this way, a dynamic balance is struck between the desire of an application to have access to additional resources without significant latency and the ability of other applications to compete for the same resources.

Figure 6:
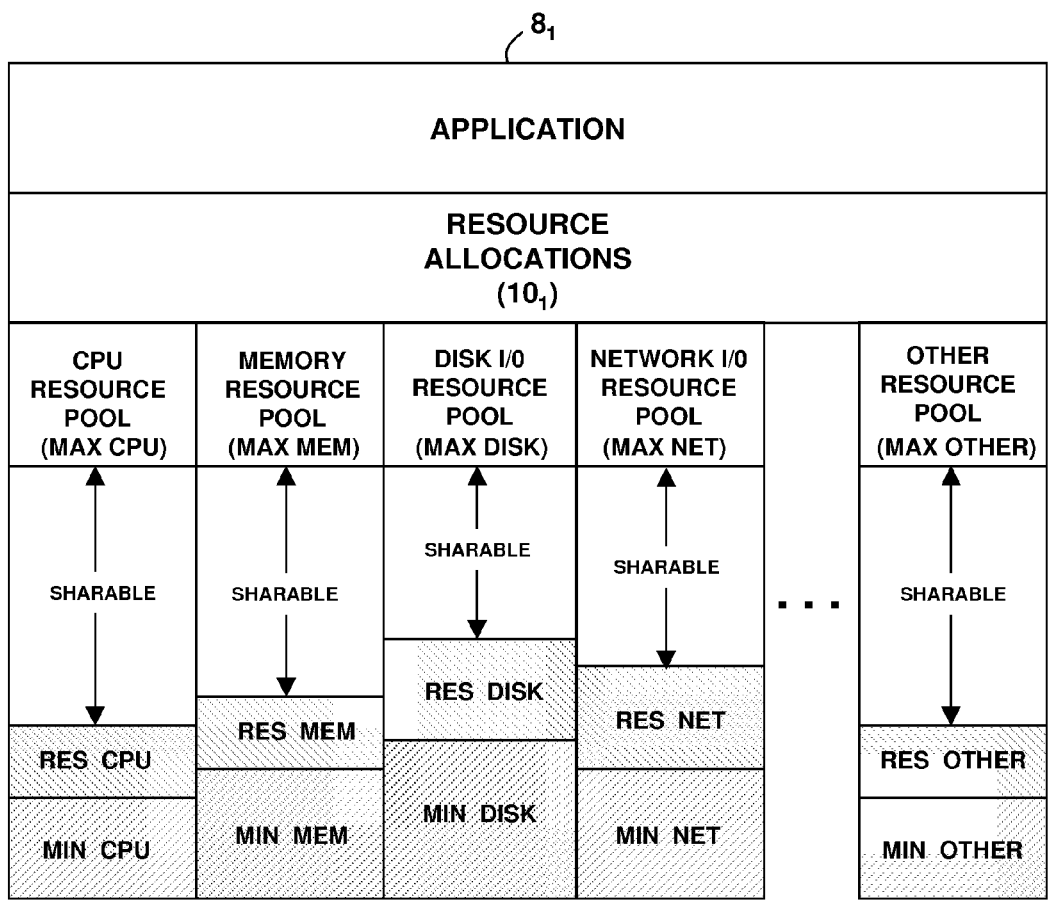
FIG. 6 is a graphical representation of a set of resource allocations for an application, including reserve resource allocations in accordance with the invention.

FIG. 6 graphically illustrates the manner in which the reserve resource allocation may be logically represented as an additional workload management parameter in the workload management system 4. In FIG. 6, the resource allocations $10_1$ for the application $8_1$ of FIG. 1 are shown. For each of the CPU, memory, disk I/O bandwidth, network I/O bandwidth and "other" resources, there is a resource pool whose maximum size is specified by a maximum resource allocation parameter MAX. A minimum resource allocation parameter MIN specifies the size of the minimum resource allocation. A reserve resource allocation parameter RES may be additionally defined by the workload management system 4 to specify the size of the reserve resource allocation.

The size of the reserve resource allocation may be specified using the RES parameter in various ways, depending on reserve resource management needs as specified by a reserve resource management policy. For example, the RES parameter could be a value that represents a percentage of the difference between the maximum resource allocation MAX and the current resource utilization of an application (i.e. a percentage of remaining resource capacity). Thus, if the application was currently using 20% of the total resource pool, the size of the remaining available and otherwise sharable resource space would be 80%. Setting the reserve resource parameter RES to 50% would create a reserve resource allocation that is 50% of the 80% sharable portion, or 40% of the total resource pool. Thus, 40% of the resource pool could not be shared with other applications while the reserve resource allocation is in force. Only the remaining 40% unreserved portion of the resource pool would be available for sharing. If the application then needed to increase its actual resource utilization from 20% to 60% of the total resource pool, the required 40% increase could be quickly obtained by growing into the entire reserve resource allocation. Thereafter, in order to satisfy the 50% RES parameter value by maintaining the reserve resource allocation at the 50%-of-remaining-capacity level, a new reserve resource allocation of 20% of the total resource pool would be assigned (i.e., 50% of the 40% remainder of the resource pool). The size of the reserve resource allocation would thus decrease from 40% of the total resource pool to 20% of the pool. The sharable portion available to other applications would also drop to 20% of the total resource pool. It will be appreciated that this method of maintaining a resource reserve asymptotically reduces the size of the reserve resource allocation as the application grows toward 100% of the total resource pool.

An alternative technique for implementing the reserve resource allocation parameter "RES" would be to have it define a fixed amount of a resource that must remain available for increased resource utilization by an application. This could be expressed as a percentage of the total resource pool. Thus, a RES parameter value of 20% would mean that 20% of the total resource pool should remain in reserve above and beyond the current resource utilization of the application. For example, regardless of whether the application was currently utilizing 30%, 50% or 70% of the total resource pool, an additional 20% of the total resource pool would be held in reserve as part of the reserve resource allocation (provided there is sufficient resource capacity left in the pool). This type of RES parameter could also specify actual physical resource units that must remain available to an application. For example, the reserve resource allocation for the memory resource $6_2$ of FIG. 1 could be "x" megabytes of RAM where $0<x<=$max available memory. It will be appreciated that this method of maintaining a resource reserve preserves the size of the reserve resource allocation regardless of the actual resource utilization by the application, at least until an upper limit is reached where there is insufficient resource capacity in the pool to maintain the reserve resource allocation at the specified size.

A still further technique for implementing the reserve resource allocation parameter "RES" would be to express it as a mathematical step function that determines the size of the reserve resource allocation. The inputs to the step function could include the application's current actual resource utilization, the rate of resource utilization increase, the minimum guaranteed allocation MIN, the maximum allocation MAX, and the total availability of the sharable portion of the resource (i.e., the portion that is not actually being shared). For example, if an application was increasing its resource utilization at a rapid rate, the reserve resource allocation could grow exponentially until the application reaches a specified resource utilization level or slows its rate of resource utilization growth.

The actual size of the reserve resource allocation available to an application at any given time can be established by policies that reflect a dynamic approach for managing the reserve resource allocation based on overall operational conditions of the application or the system 2 as a whole. For example, there may be certain times when it is appropriate to provide an application with a robust reserve resource allocation (e.g., due to high priority application needs) and other times when the reserve resource allocation should be reduced or even deactivated entirely (e.g., when there is excessive contention for the resource by other deserving applications).

There are any number of reserve resource management policies that could be employed by the workload management system 4 to adjust a reserve resource allocation over time. One exemplary approach would be to base the reserve resource management policy on a synchronous time quanta schedule. For example, a reserve resource allocation could be assigned to an application by the workload management system 4 at predetermined times during a twenty-four hour cycle when peak resource usage is anticipated, such as twice per day from 9:00 a.m. to 10:00 a.m. and from 1:00 p.m. to 5:00 p.m. Note that the size of the reserve resource allocation may change depending on when it is assigned. For example, an exemplary synchronous time quanta approach might be to use an initial reserve policy for an application following application start up (e.g., starting twenty minutes after system boot) followed by reversion to a steady-state reserve policy as the application enters a steady-state mode. The initial policy might give the application a very large reserve resource allocation that allows the application to grow rapidly during initialization to expedite system start up. The workload management system 4 would then revert to a steady-state policy that limits the reserve resource allocation to a much smaller quantity. The reserve resource allocation could be switched a still different quantity, or disabled entirely, if the application switched from a steady-state mode to a backup mode, and so on. A third approach might be to recognize that a computing system is used for data processing during the day and batch processing in the evenings. A few key applications may thus have their reserve resource allocation increased to improve throughput for batch processing at night while shrinking or even disabling the reserve for interactive or data processing during the day.

The workload management system 4 may also implement an event-driven reserve resource management policy that takes into account the actual resource utilization of an application as compared to its maximum possible configuration. For instance, another exemplary approach would be to adopt a policy that assigns a reserve resource allocation asynchronously based on a detected state of operation of the application to which it is assigned. By way of example, the policy could specify that the reserve resource allocation is to be assigned if the application reaches a predetermined resource usage threshold, such as 10% above its minimum allocation or 50% of the entire resource pool. Other user-defined application state events could also be used to assign the reserve resource allocation. A subsequent trigger state could thereafter be used to reduce or remove the reserve resource allocation.

Figure 7A:
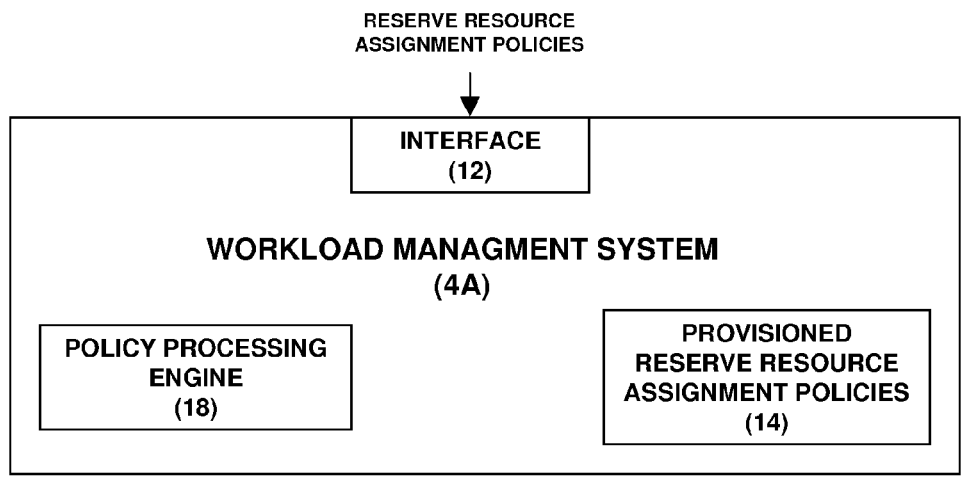
FIG. 7A is a block diagram showing a first exemplary embodiment of a workload management system in accordance with the invention.
Figure 7B:
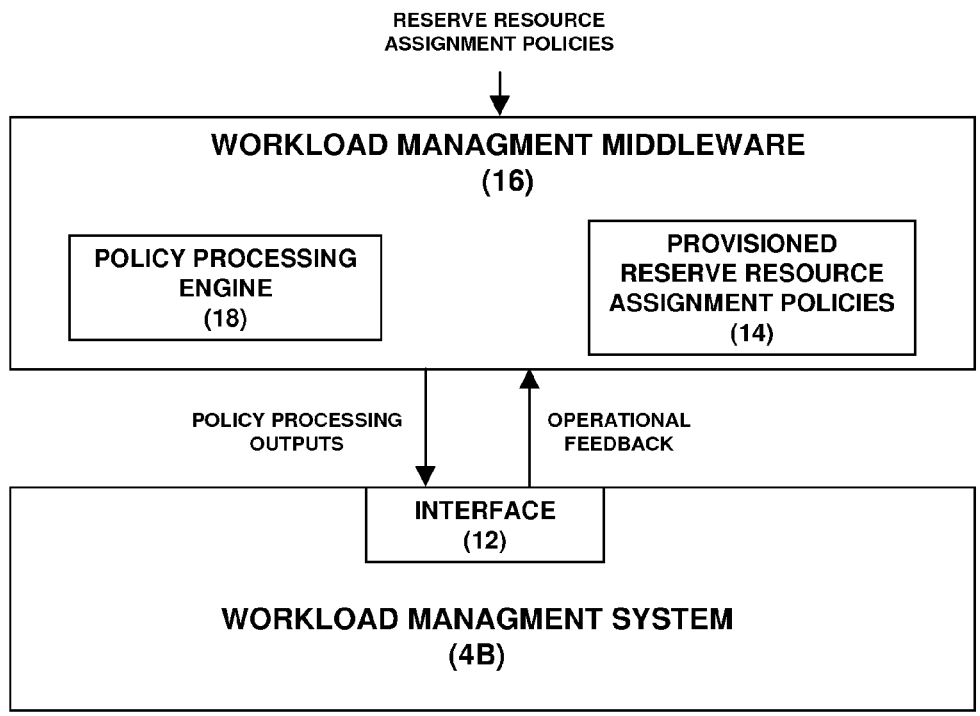
FIG. 7B is a block diagram showing a modification of the first exemplary embodiment of FIG. 7A.

Turning now to FIGS. 7A and 7B, exemplary embodiments 4A and 4B of the workload management system 4 are respectively shown in which polices for dynamically managing reserve resource allocations to applications are statically provisioned. To enable such provisioning, the workload management systems 4A and 4B are configured with a user interface 12 and either store a set of reserve resource management policies 14 (system 4A) or interact with a workload management middleware system 16 that itself stores the policy set 14 (system 4B). As earlier discussed, the workload management systems 4A and 4B may operate as part of an operating system kernel, as user-level applications, or as hybrid systems that includes both operating system and user application functionality.

The user interface 12 of both workload management system 4A and 4B may be implemented using any suitable technique, such as system or library calls, sockets, HAL (Hardware Abstraction Layer) calls, message passing APIs, or the file system paradigm found in the IBM® AIX® 5L Workload Manager and the Linux® CKRM (Class-based Kernel Resource Monitor) framework (discussed above). The policy set 14 contains policies that govern the utilization of reserve resource allocations by applications. For example, one such policy could specify how the size of the reserve resource allocation should increase or decrease (or remain the same) in response to changes in actual resource utilization by an application and other operational conditions (as described above). Another policy could specify the schedule or conditions under which the reserve resource allocation feature should be activated on behalf of the application.

Because the workload management system 4A stores the policy set 14, the interface 12 of this system may be used by a system administrator to input policies to the workload management system. The policy input may take any suitable form, such as a specification of reserve resource allocation RES parameters, or as a specification of policy rules that, for example, control the reserve resource allocation over time or based on prevailing system conditions. A policy processing engine 18 in the workload management system 4A may be used to process the policy set 14. This processing will dynamically set the size of the reserve resource allocation and manage the activation state of the reserve resource allocation feature.

In the workload management system 4B, the policy set 14 is stored in the workload management middleware system 16. The middleware system 16 also includes the policy processing engine 18 that processes the policy rules. The outputs of this policy processing are provided to the workload management system 4B via the interface 12. The interface 12 is also used by the workload management system 4B to provide operational feedback to the policy processing engine 18.

Figure 8A:
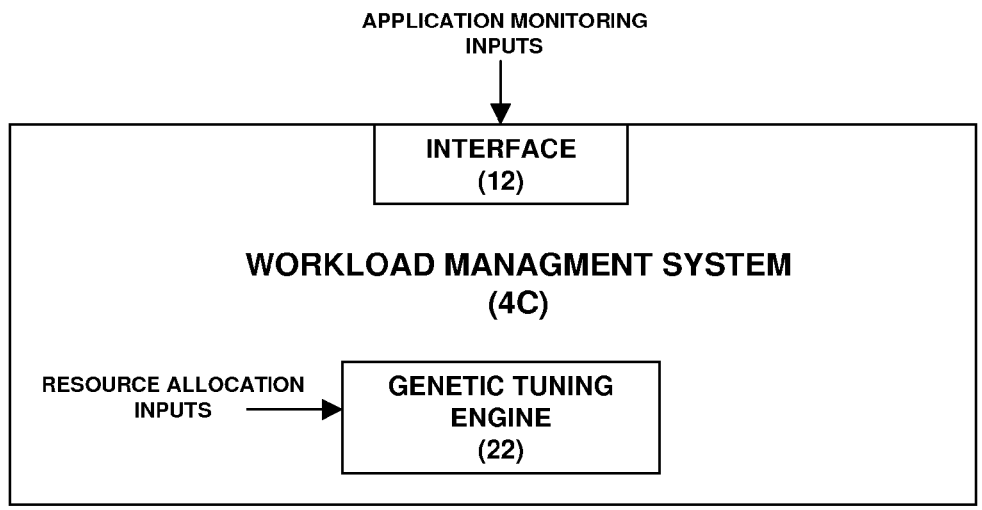
FIG. 8A is a block diagram showing a second exemplary embodiment of a workload management system in accordance with the invention.
Figure 8B:
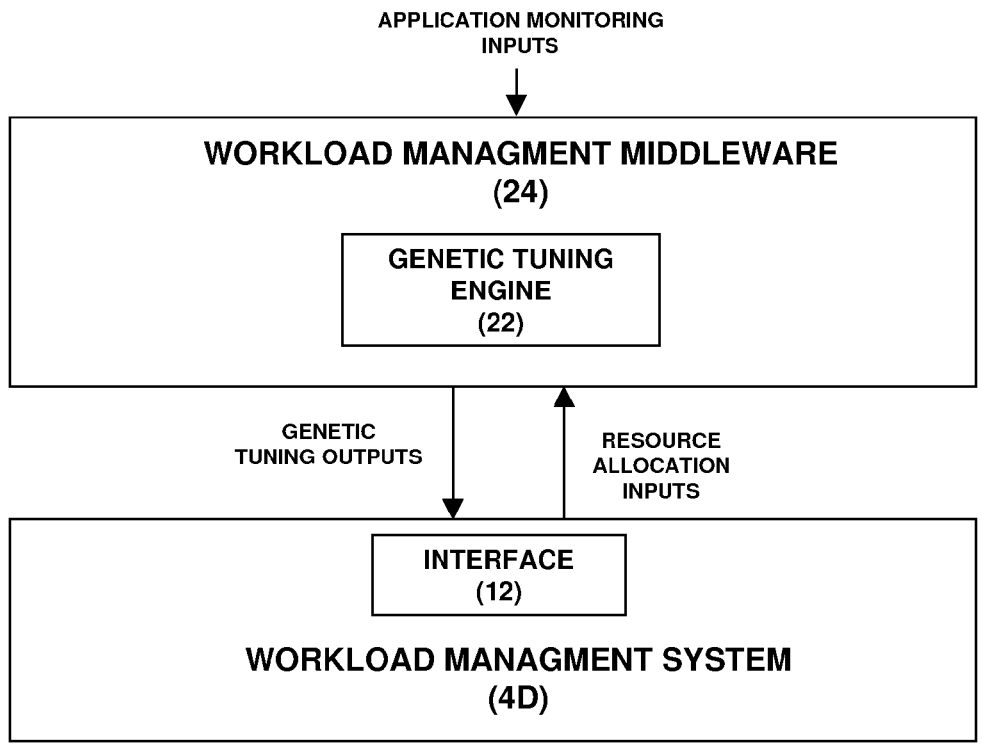
FIG. 8B is a block diagram showing a modification of the first exemplary embodiment of FIG. 8A.
Figure 9:
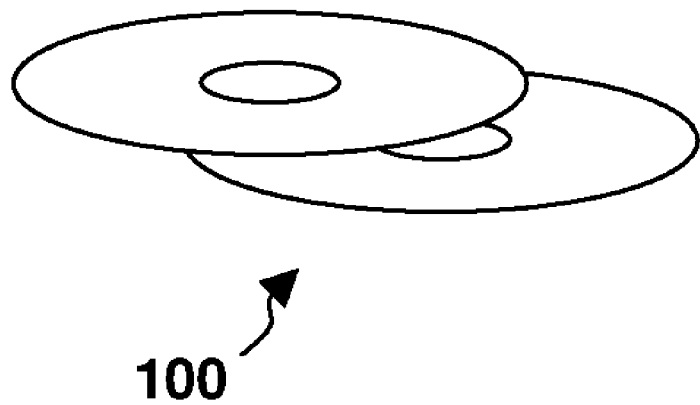
FIG. 9 is a diagrammatic illustration showing physical media that may be used to provide a computer program product for implementing a workload management system in accordance with the invention.

Turning now to FIGS. 8A and 8B, exemplary embodiments 4C and 4D of the workload management system 4 are respectively shown in which the policies for assigning reserve resource allocations to an application are optimized autonomously using self-tuning techniques. To enable such dynamic determination, the workload management systems 4C and 4D are configured with a user interface 20 and either implement a genetic tuning engine 22 (system 4C) or interact with a workload management middleware system 24 that implements the genetic tuning engine 22 (system 4D). Again, as earlier discussed, the workload management systems 4C and 4D may operate as part of an operating system kernel, as user-level applications, or as hybrid systems that includes both operating system and user application functionality.

The genetic tuning engine 22 of the workload management systems 4C and 4D receives application monitoring inputs that are indicative of the performance of applications that utilize the resource being managed. Such inputs may be received from the applications themselves, from the underlying operating system, or both. The genetic tuning engine 22 also receives resource allocation inputs that represent current resource allocation and utilization data. Such inputs are received from the workload management system 4C or 4D itself.

The application monitoring inputs may include application performance and workload diagnostics for one or more applications. The resource allocation inputs may include such information as the minimum resource allocation MIN, the maximum resource allocation MAX, the current level of resources being utilized, and the reserve resource allocation RES. The application monitoring and resource allocation inputs are passed to the genetic tuning engine 22 for processing. Using conventional genetic techniques, the genetic tuning engine 22 may be programmed to execute a multi-generational tuning cycle. For each generation, the genetic tuning engine 22 could (1) select a set of parameters governing the reserve resource allocation for an application, (2) vary one or more of the parameters and adjust the reserve resource allocation accordingly, (3) evaluate the application monitoring inputs that are received following the adjustment to the reserve resource allocation, and (4) assess the favorability of the results relative to the results from previous generations. A new generation of reserve resource allocation parameters may be created based on the most favorable results, and the foregoing process may be repeated for the new generation. In this way, an optimum set of reserve resource allocation parameters can be arrived at for the application.

Accordingly, a technique for managing application workloads in a data processing system using temporarily assignable reserve resource allocations has been disclosed. It will be appreciated that the foregoing concepts may be variously embodied in any of a data processing system, a machine implemented method, and a computer program product in which programming logic is provided by one or more machine-readable media for use in controlling a data processing system to perform the required functions. Exemplary machine-readable media for providing such programming logic are shown by reference numeral 100 in FIG. 12. The media 100 are shown as being portable optical storage disks of the type that are conventionally used for commercial software sales, such as compact disk-read only memory (CD-ROM) disks, compact disk-read/write (CD-R/W) disks, and digital versatile disks (DVDs). Such media can store the programming logic of the invention, either alone or in conjunction with another software product that incorporates the required functionality. The programming logic could also be provided by portable magnetic media (such as floppy disks, flash memory sticks, etc.), or magnetic media combined with drive systems (e.g. disk drives), or media incorporated in data processing platforms, such as random access memory (RAM), read-only memory (ROM) or other semiconductor or solid state memory. More broadly, the media could comprise any electronic, magnetic, optical, electromagnetic, infrared, semiconductor system or apparatus or device, transmission or propagation signal or signal-carrying medium (such as a network), or other entity that can contain, store, communicate, propagate or transport the programming logic for use by or in connection with a data processing system, computer or other instruction execution system, apparatus or device.

Although various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A method for managing application workloads in a data processing system, comprising:
   establishing a reserve resource allocation of a data processing resource for exclusive use by a data processing application having a need to utilize said data processing resource;
   sharing a sharable portion of said data processing resource that is not part of said reserve resource allocation or otherwise utilized by said application and one or more other applications, said sharable portion of said data processing resource being sharable between said application and said one or more other applications;
   allowing said application to consume said reserve resource allocation when said application desires to increase its utilization of said data processing resource; and
   replenishing said reserve resource allocation as said application consumes said reserve resource allocation, said reserve resource allocation being replenished from said sharable portion of said data processing resource and from said one or more other applications if said reserve resource allocation cannot be replenished from said sharable portion of said data processing resource.

2. A method in accordance with claim 1 wherein said reserve resource allocation is of fixed size.

3. A method in accordance with claim 1 wherein said reserve resource allocation is of variable size and said size is varied according to a level of utilization of said data processing resource by said application.

4. A method in accordance with claim 1 wherein said reserve resource allocation is managed according to a predetermined time quanta schedule.

5. A method in accordance with claim 1 wherein said reserve resource allocation is managed according to a state of operation of said application.

6. A method in accordance with claim 1 wherein said reserve resource allocation is managed according to a provisioned policy.

7. A method in accordance with claim 1 wherein said reserve resource allocation is managed using an autonomic self-tuning technique.

8. A method in accordance with claim 1 further including assigning a minimum resource allocation and a maximum resource allocation to said application.

9. A data processing system, comprising:
   a data processing resource; and
   workload management system logic comprising data processing hardware and adapted to:
   establish a reserve resource allocation of said data processing resource for exclusive use by a data processing application having a need to utilize said data processing resource;
   sharing a sharable portion of said data processing resource that is not part of said reserve resource allocation or otherwise utilized by said application and one or more other applications, said sharable portion of said data processing resource being sharable between said application and said one or more other applications;
   allowing said application to consume said reserve resource allocation when said application desires to increase its utilization of said data processing resource; and
   replenishing said reserve resource allocation as said application consumes said reserve resource allocation, said reserve resource allocation being replenished from said sharable portion of said data processing resource and from said one or more other applications if said reserve resource allocation cannot be replenished from said sharable portion of said data processing resource.

10. A system in accordance with claim 9 wherein said reserve resource allocation is of fixed size.

11. A system in accordance with claim 9 wherein said reserve resource allocation is of variable size and said workload management logic is adapted to vary said size according to a level of utilization of said data processing resource by said application.

12. A system in accordance with claim 9 wherein said reserve resource allocation is managed by said workload management logic according to a predetermined time quanta schedule.

13. A system in accordance with claim 9 wherein said reserve resource allocation is managed by said workload management logic according to a state of operation of said application.

14. A system in accordance with claim 9 wherein said reserve resource allocation is managed by said workload management logic according to a policy that is provisioned in said data processing system.

15. A system in accordance with claim 9 wherein said reserve resource allocation is managed by said workload management logic using an autonomic self-tuning technique implemented by a genetic tuning engine in said data processing system.

16. A system in accordance with claim 9 wherein said workload management logic is adapted to establish a minimum resource allocation and a maximum resource allocation for said application.

17. A computer program product, comprising:
   one or more machine readable storage media;

programming logic provided by said machine readable media for programming a data processing system to manage application workloads, as by:

establishing a reserve resource allocation of a data processing resource for exclusive use by a data processing application having a need to utilize said data processing resource;

sharing a sharable portion of said data processing resource that is not part of said reserve resource allocation or otherwise utilized by said application and one or more other applications, said sharable portion of said data processing resource being sharable between said application and said one or more other applications;

allowing said application to consume said reserve resource allocation when said application desires to increase its utilization of said data processing resource; and replenishing said reserve resource allocation as said application consumes said reserve resource allocation, said reserve resource allocation being replenished from said sharable portion of said data processing resource and from said one or more other applications if said reserve resource allocation cannot be replenished from said sharable portion of said data processing resource.

18. A program product in accordance with claim 17 wherein said reserve resource allocation is of fixed size.

19. A program product in accordance with claim 17 wherein said reserve resource allocation is of variable size and said size is varied according to a level of utilization of said data processing resource by said application.

20. A program product in accordance with claim 17 wherein said reserve resource allocation is managed according to a predetermined time quanta schedule.

21. A program product in accordance with claim 17 wherein said reserve resource allocation is managed according to a state of operation of said application.

22. A program product in accordance with claim 17 wherein said reserve resource allocation is managed according to a provisioned policy.

23. A program product in accordance with claim 17 wherein said reserve resource allocation is managed using an artificial intelligence technique.

24. A program product in accordance with claim 17 wherein said programming logic is further adapted program a data processing platform to assign a minimum resource allocation and a maximum resource allocation to said application.

25. A computer program product, comprising:
one or more machine readable storage media;
programming logic provided by said machine readable media for programming a data processing system to support application workload management, as by:
providing an interface for managing a data processing resource so that it may be allocated for use by data processing applications that execute in said data processing system;
receiving a first resource allocation parameter via said interface that specifies a resource pool that is available to a data processing application and which is potentially sharable with one or more other applications;
receiving a second resource allocation parameter via said interface that specifies a minimum allocation of said resource in said resource pool that will be dedicated to said application and not shared with said one or more other applications;
receiving a third resource allocation parameter via said interface that specifies a reserve resource allocation in said resource pool for exclusive use by said application;
using said third reserve resource allocation parameter to determine a size of said reserve resource allocation that may be fixed or variable according to a level of utilization of said resource by said application;
sharing a sharable portion of said data processing resource that is not part of said reserve resource allocation or being utilized by said application and one or more other applications, said sharable portion of said data processing resource being sharable between said application and said one or more other applications;
allowing said application to consume said reserve resource allocation when said application desires to increase its utilization of said data processing resource; and
replenishing said reserve resource allocation from said sharable portion of said data processing resource as said application consumes said reserve resource allocation.

26. A program product in accordance with claim 25 wherein said reserve programming logic is further adapted program a data processing platform to manage said reserve resource allocation according to one of a provisioned policy or an autonomic self-tuning technique.

27. A computer program product, comprising:
one or more machine readable storage media;
programming logic provided by said machine readable media for programming a data processing system to support application workload management, as by:
defining a pool of a data processing resource that is available to a data processing application that utilizes said resource and which is potentially sharable with other applications;
establishing a reserve allocation of said resource in said resource pool for exclusive use by said application;
sharing a sharable portion of said data processing resource that is not part of said reserve resource allocation or otherwise utilized by said application and one or more other applications, said sharable portion of said data processing resource being sharable between said application and one or more other applications;
allowing said application to consume said reserve resource allocation when said application desires to increase its utilization of said data processing resource;
replenishing said reserve resource allocation as said application consumes said reserve resource allocation, said reserve resource allocation being replenished from said sharable portion of said data processing resource and from said one or more other applications if said reserve resource allocation cannot be replenished from said sharable portion of said data processing resource; and
dynamically maintaining said reserve resource allocation at a desired size during changes in resource utilization by said application.

* * * * *